Sept. 15, 1931. A. B. JOHNSON 1,823,272
WOODWORKING MACHINE
Filed Jan. 12, 1931 13 Sheets-Sheet 1
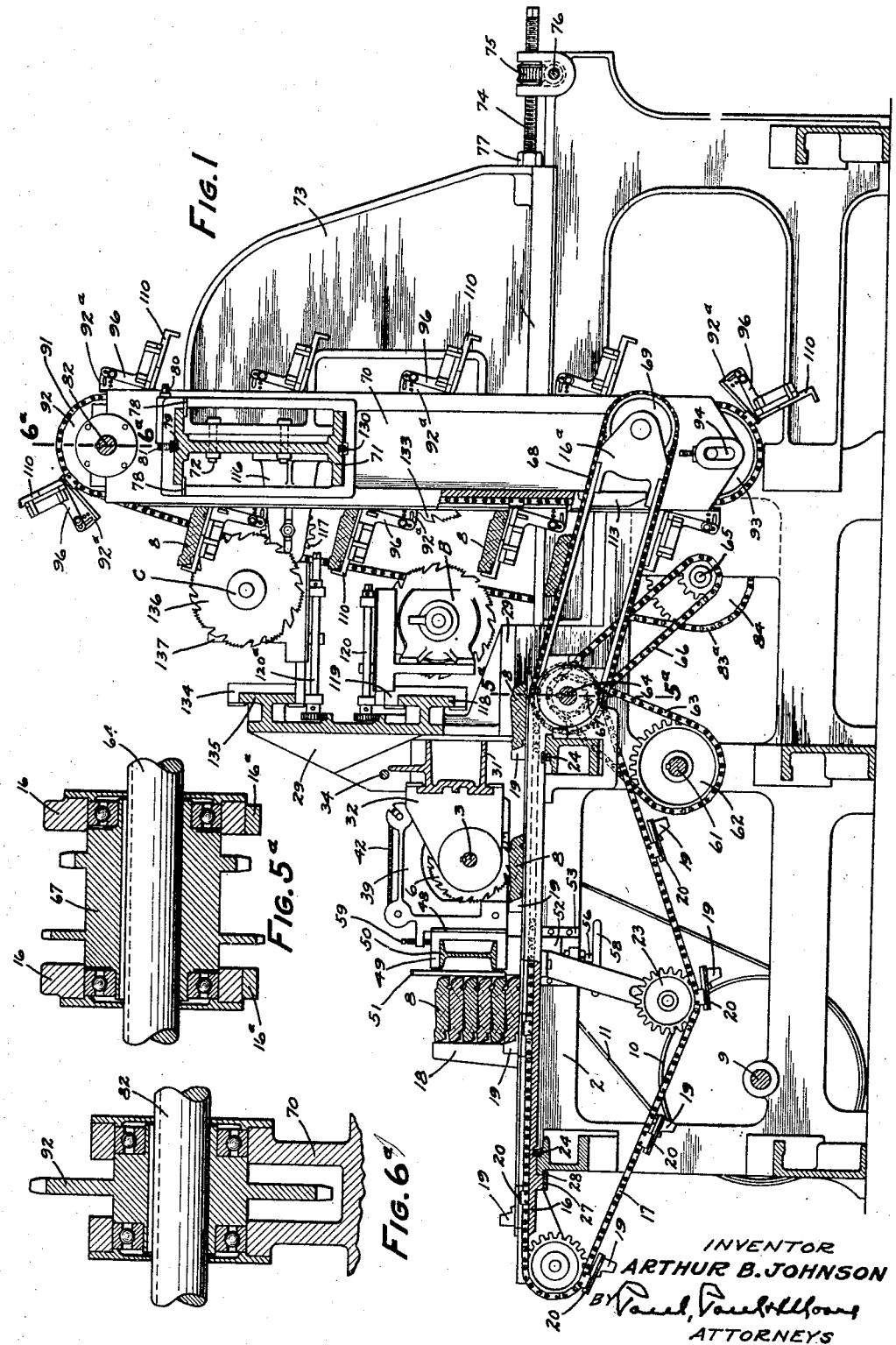
INVENTOR
ARTHUR B. JOHNSON
BY
ATTORNEYS

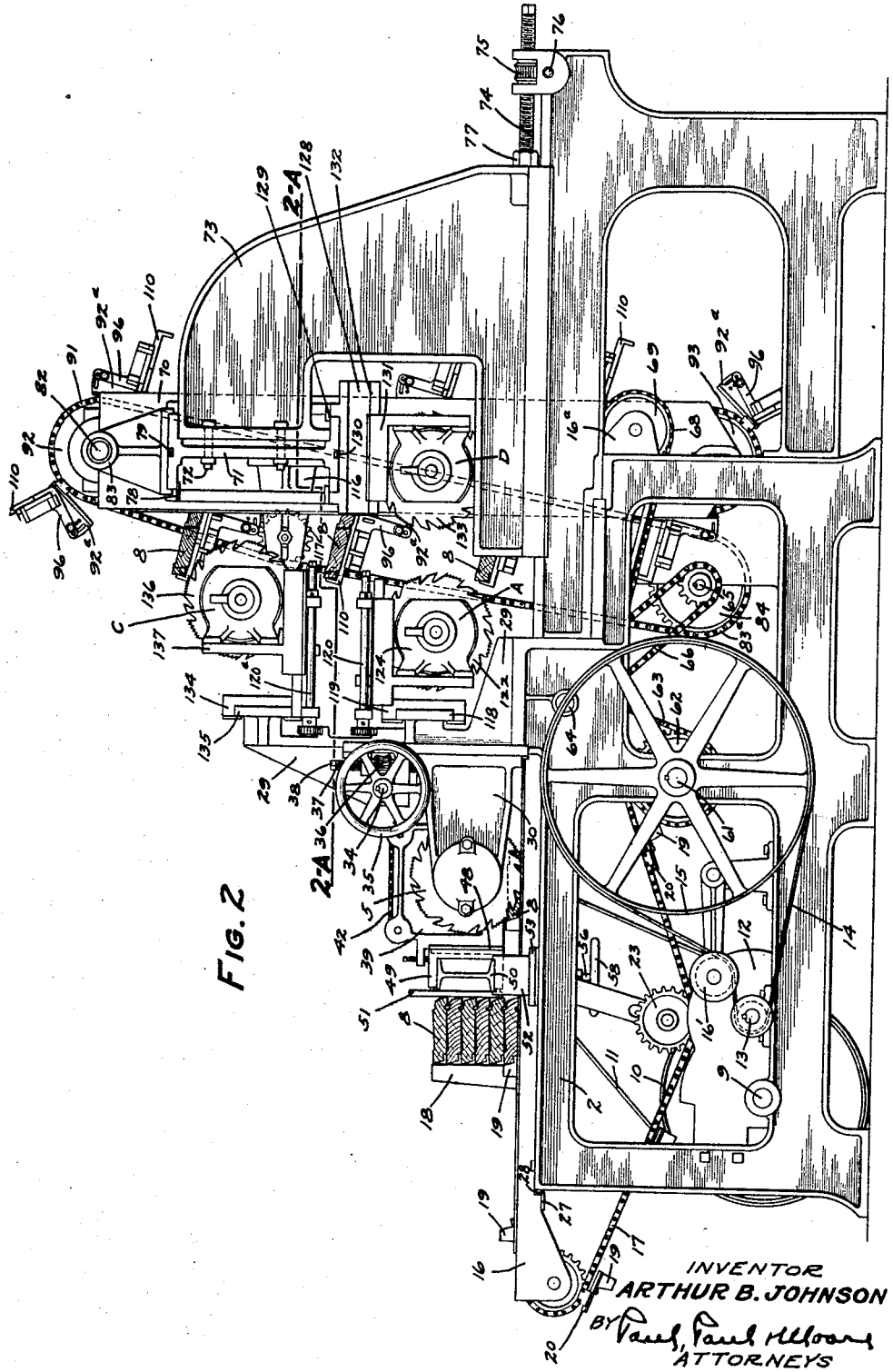

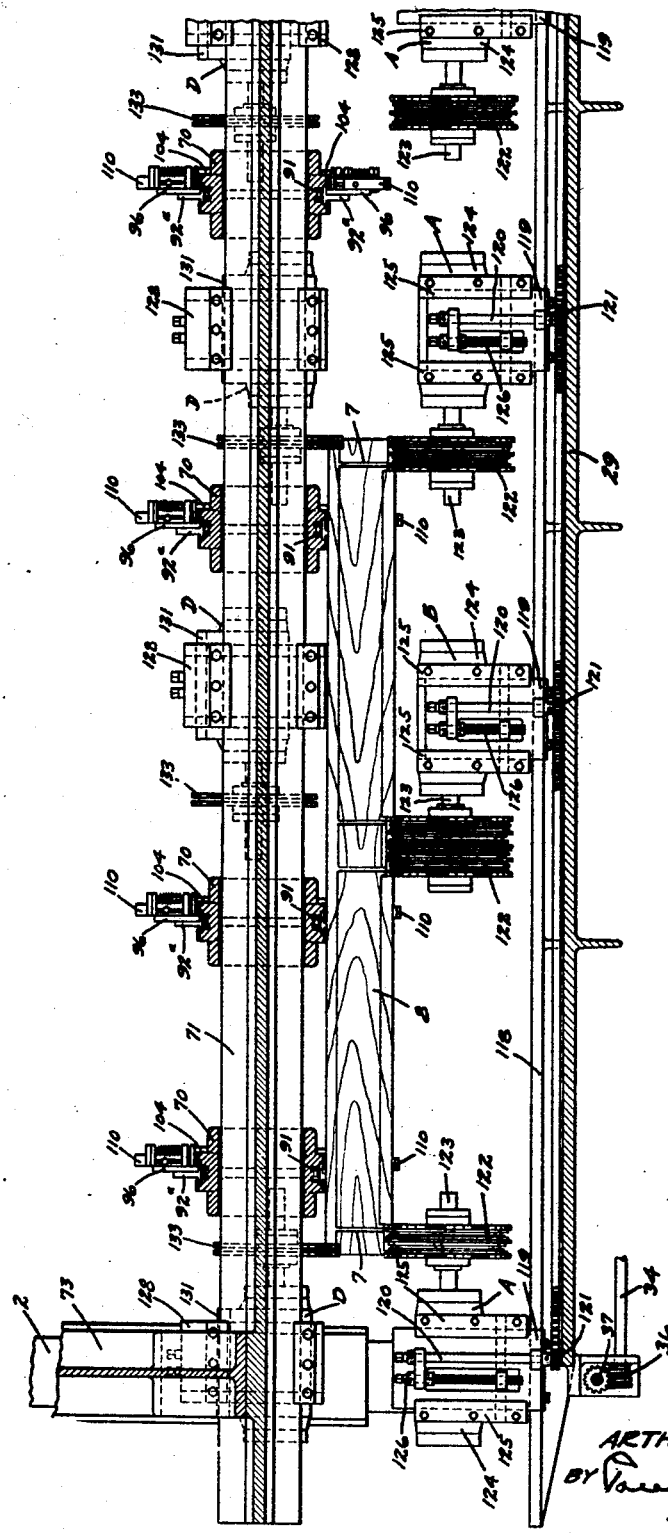

Sept. 15, 1931.    A. B. JOHNSON    1,823,272
WOODWORKING MACHINE
Filed Jan. 12, 1931    13 Sheets-Sheet 4
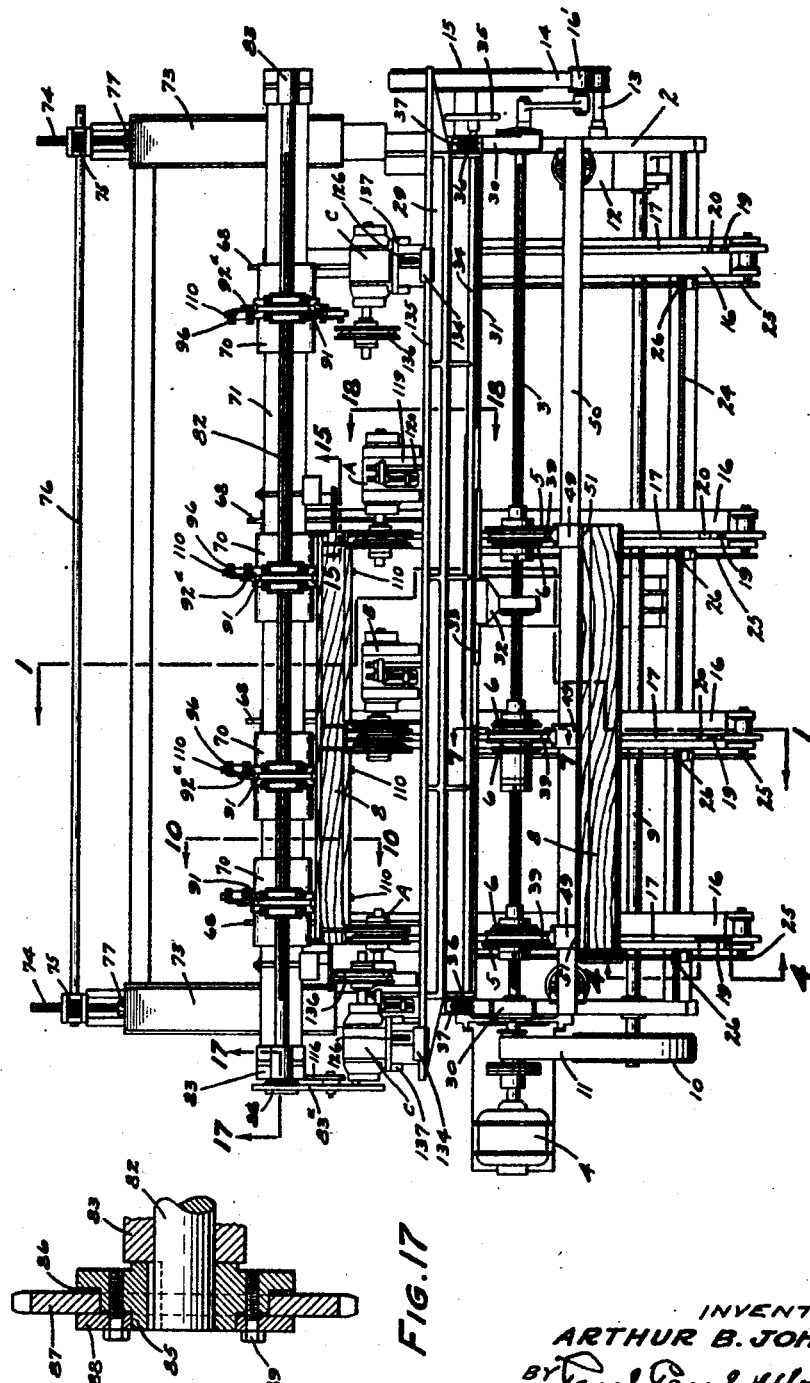
INVENTOR
ARTHUR B. JOHNSON
BY
ATTORNEYS Sept. 15, 1931.  A. B. JOHNSON  1,823,272
WOODWORKING MACHINE
Filed Jan. 12, 1931   13 Sheets-Sheet 5

INVENTOR
ARTHUR B. JOHNSON
BY
ATTORNEYS

Sept. 15, 1931.                A. B. JOHNSON                1,823,272
                            WOODWORKING MACHINE
                     Filed Jan. 12, 1931        13 Sheets-Sheet 6
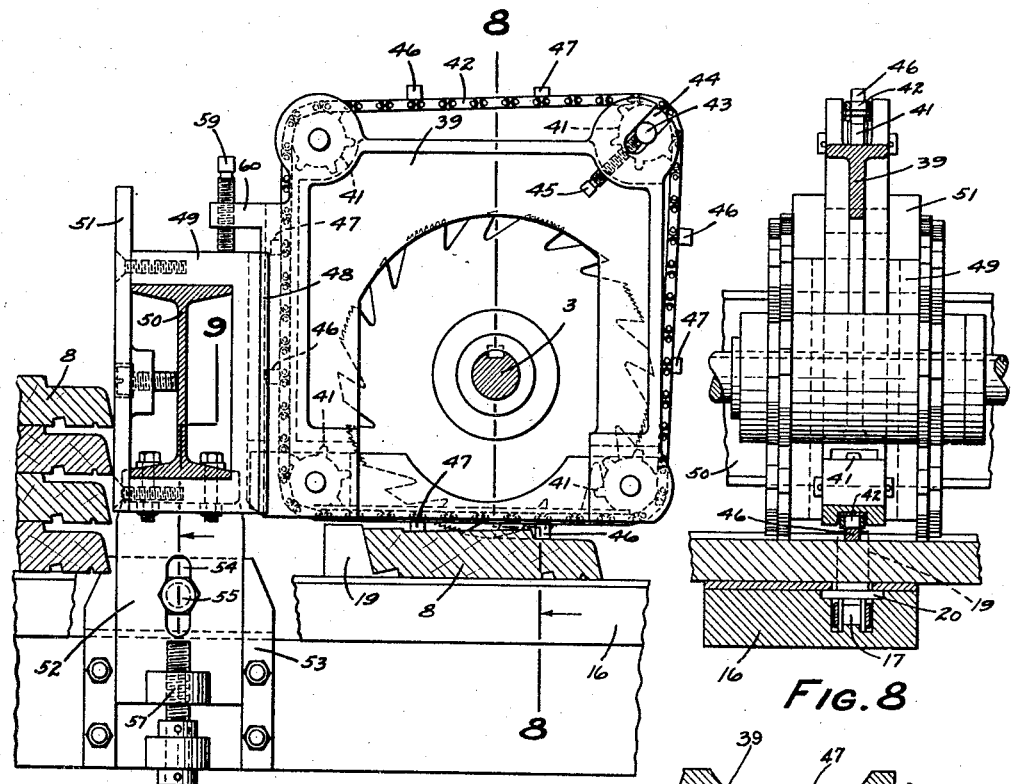
FIG.7
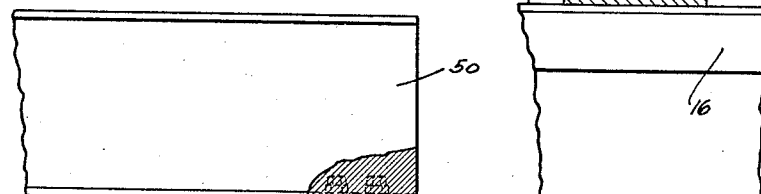
FIG.7-A
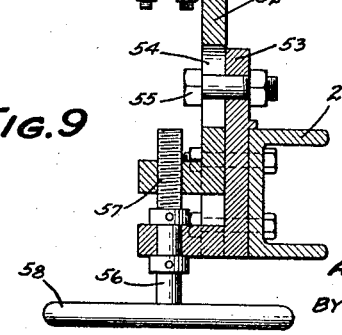
FIG.9
INVENTOR
ARTHUR B. JOHNSON
BY
ATTORNEYS

INVENTOR
ARTHUR B. JOHNSON
BY
ATTORNEYS

Sept. 15, 1931.  A. B. JOHNSON  1,823,272
WOODWORKING MACHINE
Filed Jan. 12, 1931   13 Sheets-Sheet 8
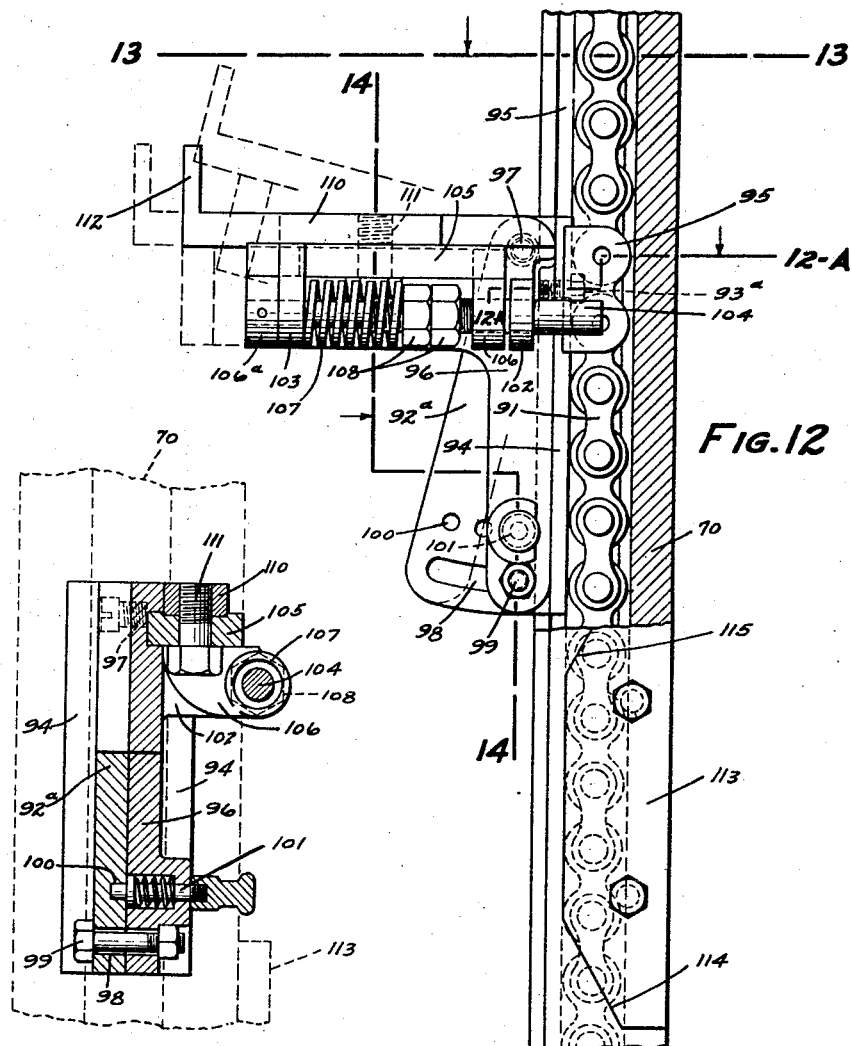
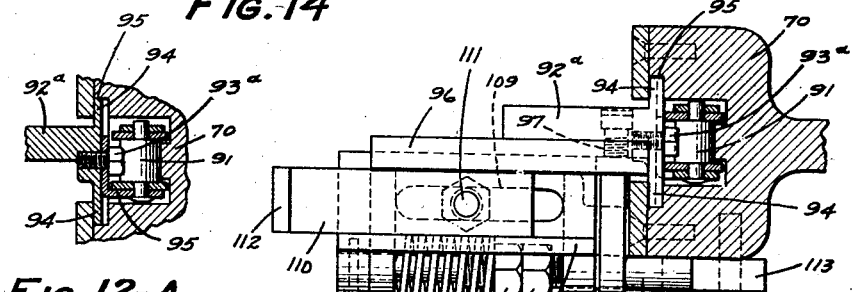
INVENTOR
ARTHUR B. JOHNSON
BY Paul, Paul Moore
ATTORNEYS Sept. 15, 1931.    A. B. JOHNSON    1,823,272
WOODWORKING MACHINE
Filed Jan. 12, 1931    13 Sheets-Sheet 9

INVENTOR
ARTHUR B. JOHNSON
BY
ATTORNEYS

Sept. 15, 1931.     A. B. JOHNSON     1,823,272
WOODWORKING MACHINE
Filed Jan. 12, 1931     13 Sheets-Sheet 10
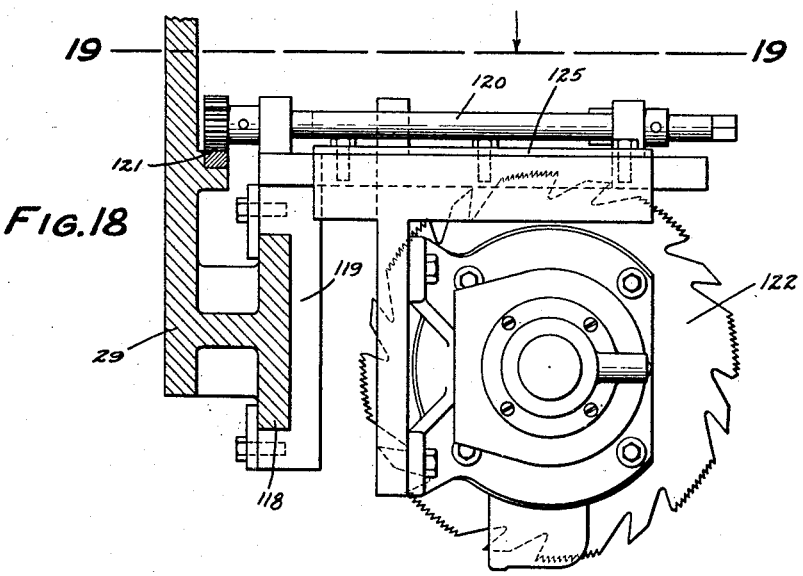
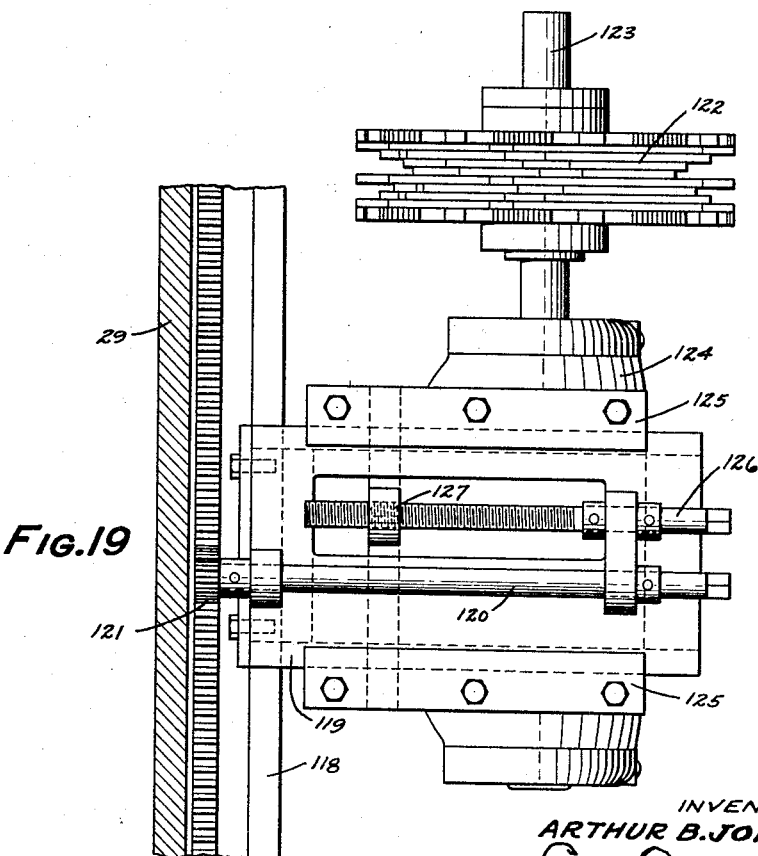
INVENTOR
ARTHUR B. JOHNSON
BY
ATTORNEYS Sept. 15, 1931. A. B. JOHNSON 1,823,272
WOODWORKING MACHINE
Filed Jan. 12, 1931 13 Sheets-Sheet 11

INVENTOR
ARTHUR B. JOHNSON
BY
ATTORNEYS

Sept. 15, 1931.  A. B. JOHNSON  1,823,272
WOODWORKING MACHINE
Filed Jan. 12, 1931   13 Sheets-Sheet 12

INVENTOR
ARTHUR B. JOHNSON
BY
ATTORNEYS

Sept. 15, 1931.    A. B. JOHNSON    1,823,272
WOODWORKING MACHINE
Filed Jan. 12, 1931    13 Sheets-Sheet 13

INVENTOR
ARTHUR B. JOHNSON
BY
ATTORNEYS

Patented Sept. 15, 1931

1,823,272

UNITED STATES PATENT OFFICE

ARTHUR B. JOHNSON, OF MINNEAPOLIS, MINNESOTA, ASSIGNOR TO ANDERSEN FRAME CORPORATION, OF BAYPORT, MINNESOTA, A CORPORATION OF WISCONSIN

WOODWORKING MACHINE

Application filed January 12, 1931. Serial No. 508,055.

This invention relates to the type of woodworking machine shown and described in my pending application for Letters Patent for the United States, Number 233,165, filed November 14, 1927. The object of my present invention generally is to improve and simplify the machine disclosed in the above named application to the end that work of varying lengths and widths may be more easily and conveniently handled in the machine, and, further to the end that the operating parts may be reduced in number and made easy of adjustment and thereby the production increased and the quality of the work improved.

The objects specifically of my present invention are to provide improved means for relative adjustment of the work supporting skids and feed belts and the dado cutters and for holding the work firmly on the skids during the dado cutting operation.

A further object is to provide improved means for laterally adjusting the work supporting skids and primary feed belts and simultaneously effecting a corresponding adjustment of the secondary feed belts by which the work is delivered to the elevating carriers.

A further object is to provide improved carriers, whereby the work may be automatically picked up and held securely clamped during the edge notching operation, with special provision for tilting the work when its nature requires.

An additional object is the improved means for supporting the end and intermediate notching heads with provision for readily adapting them for work of different dimensions and grouping the heads with independent operating means upon opposite sides of the work.

Also the provision for forming the secondary or supplemental end notches in work of certain character and the means whereby this supplemental notching mechanism is rendered ineffective when the secondary notches are not to be formed.

And, further the provision whereby end notches may be formed in both longitudinal edges of the work as desired, and further the provision for easily and effectively holding the work against longitudinal movement during the notching cutting operation.

The invention consists generally in various constructions and combinations, all as hereinafter described and particularly pointed out in the claims.

In the accompanying drawings forming part of this specification,

Figure 1 is a cross sectional view on the line 1—1 of Figure 3, showing the general construction of the machine and the manner of feeding the material therethrough;

Figure 2 is a side elevation of the machine;

Figure 2—A is a sectional view on line 2A—2A of Figure 2.

Figure 5:
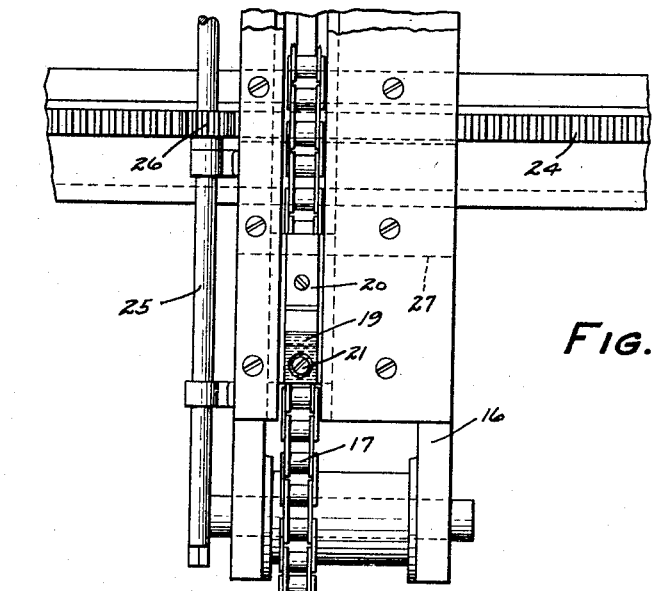
Figure 4:
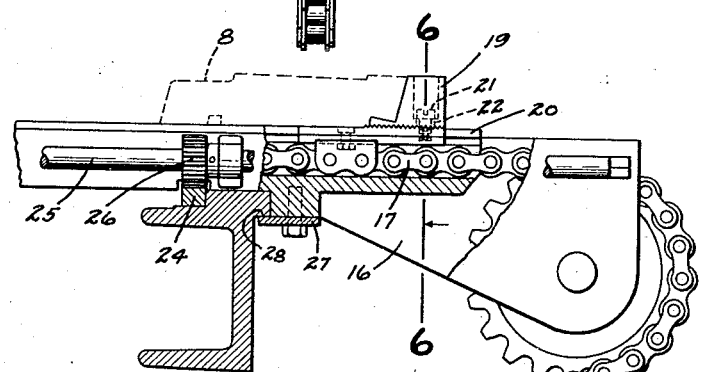
Figure 6:
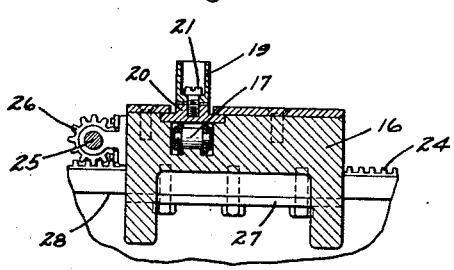
Figure 11:
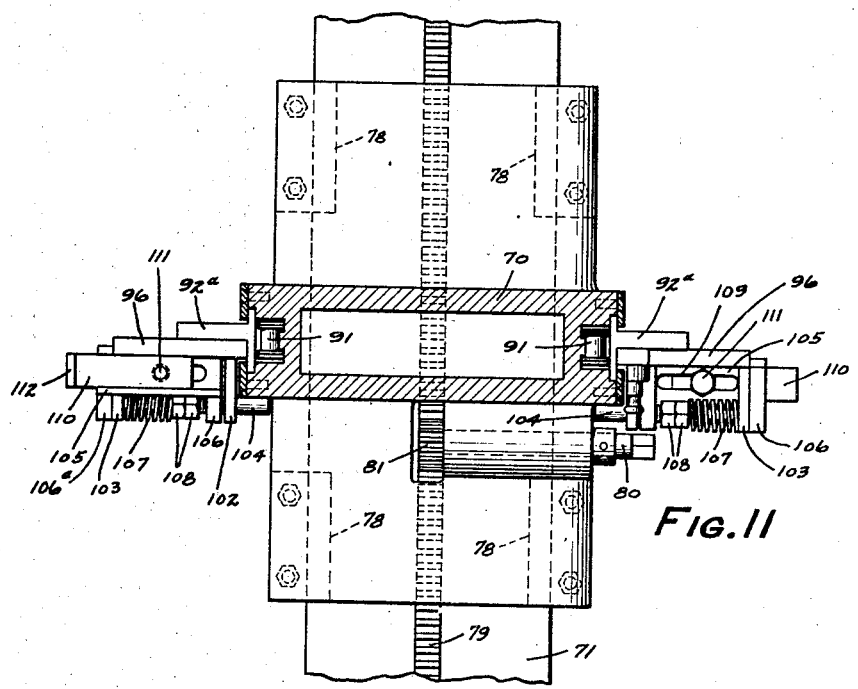
Figure 10:
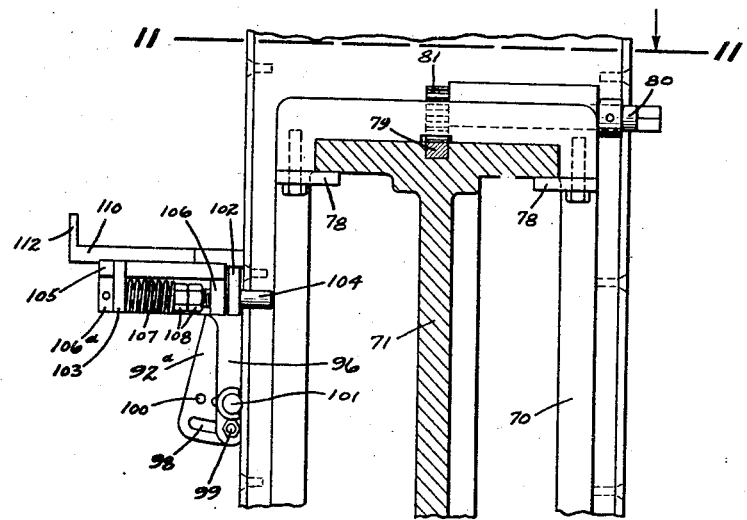

Figure 3 is a plan view of the machine showing the relative positions of the cutter heads or saws and the skids;

Figure 4 is an enlarged detail sectional view on the line 4—4 of Figure 3, showing the receiving end of one of the horizontal skids;

Figure 5 is a plan view of Figure 4, showing the means for laterally adjusting a skid;

Figure 5$^a$ is a detail sectional view on the line 5$^a$—5$^a$ of Figure 1;

Figure 6 is a detail sectional view on the line 6—6 of Figure 4;

Figure 6$^a$ is a detail sectional view on the line 6$^a$—6$^a$ of Figure 1;

Figure 7 is an enlarged detail sectional view substantially on the line 7—7 of Figure 3, showing the means for holding the sills or jambs firmly upon the horizontal skids while cutting the transverse grooves or dadoes therein;

Figure 7—A is a detail sectional view showing the lug that is engaged by a jamb for advancing the presser belt;

Figure 8 is a detail sectional view on the line 8—8 of Figure 7 with some of the parts being shown in full;

Figure 9 is a detail sectional view on the line 9—9 of Figure 7, showing a device whereby the work holding means may be vertically adjusted with respect to the horizontal skids;

Figure 10 is an enlarged detail sectional view on the line 10—10 of Figure 3, showing a portion of one of the vertical skids and the means provided on each skid for laterally adjusting it;

Figure 11 is a sectional plan view on the line 11—11 of Figure 10;

Figure 12 is an enlarged detail view, partially in section, showing one of the carriers for conveying the work upwardly on the upright skids, and the means provided on each carrier for holding the work against the skids, and also the means for angularly adjusting the carrier with respect to the skids;

Figure 12-A is a detail sectional view on section line 12A—12A of Figure 12.

Figure 15:
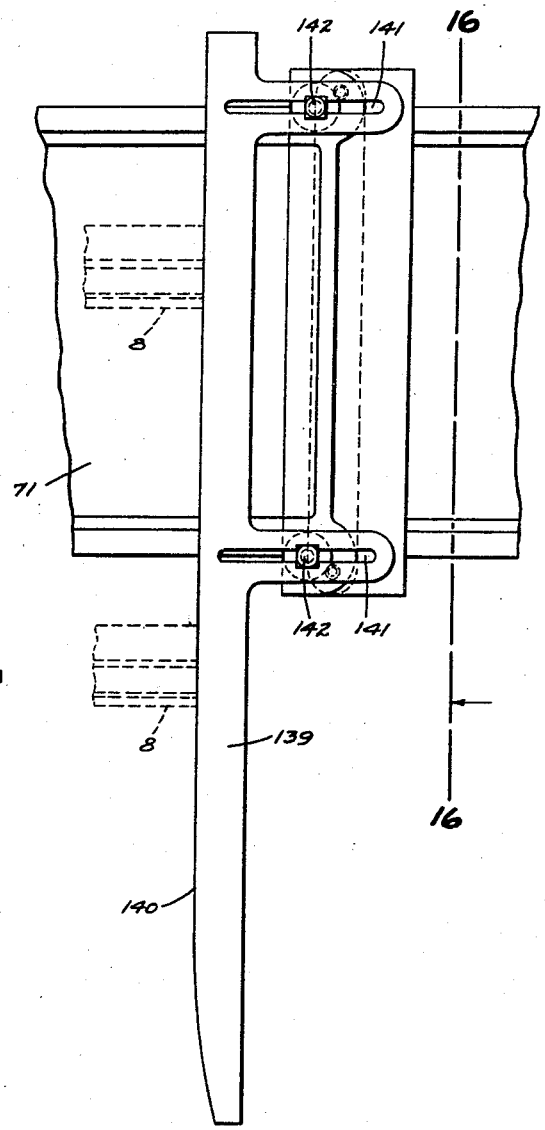
Figure 16:
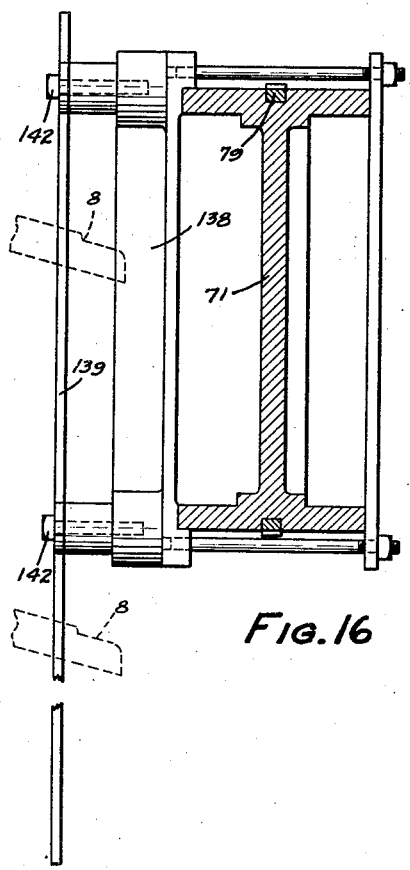

Figure 13 is a sectional plan view on the line 13—13 of Figure 12;

Figure 14 is a detail sectional view on the line 14—14 of Figure 12;

Figure 15 is a detail sectional view on the line 15—15 of Figure 3, showing the means for preventing endwise movement of the work while being conveyed upwardly by the carriers;

Figure 16 is a detail sectional view on the line 16—16 of Figure 15;

Figure 17 is a detail sectional view on the line 17—17 of Figure 3, showing the means for timing the vertical conveyer belts with respect to the horizontal conveyer.

Figure 20:
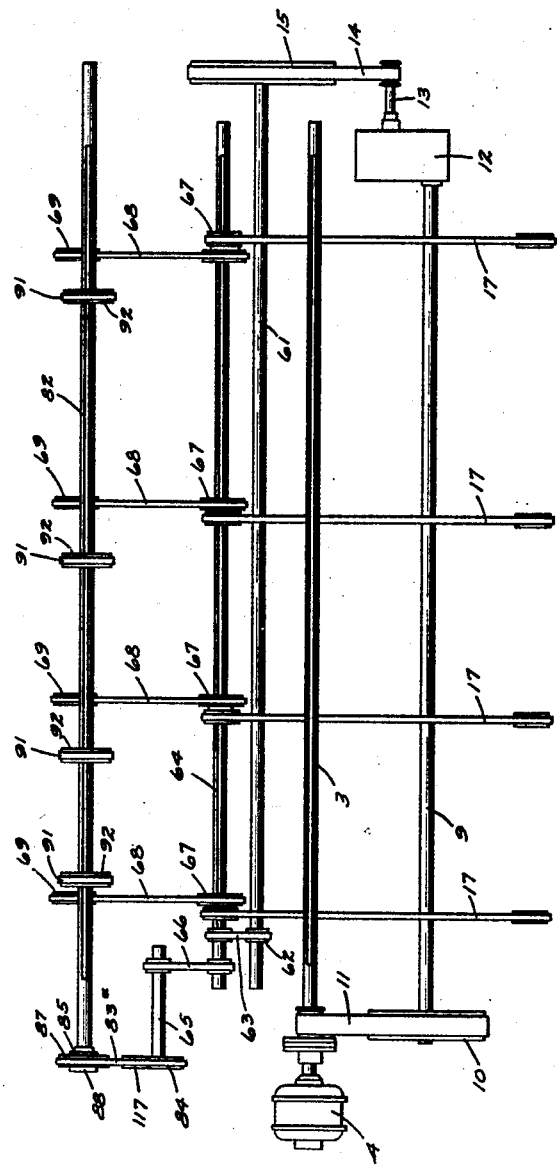
Figure 21:
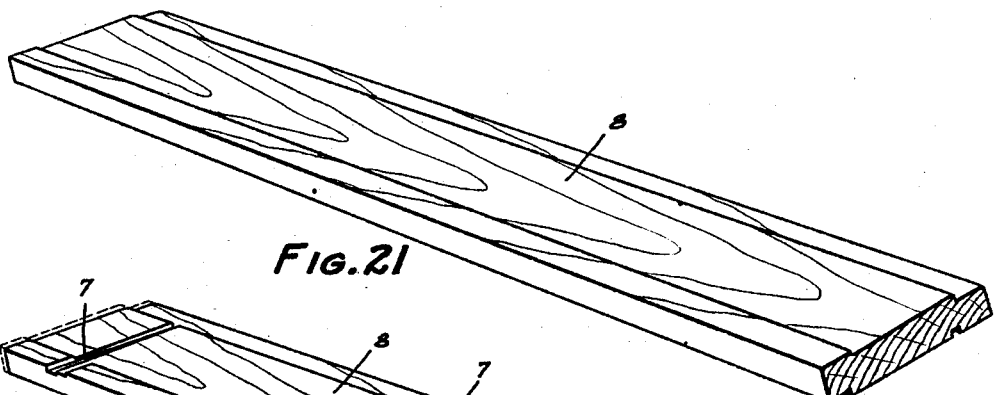
Figure 22:
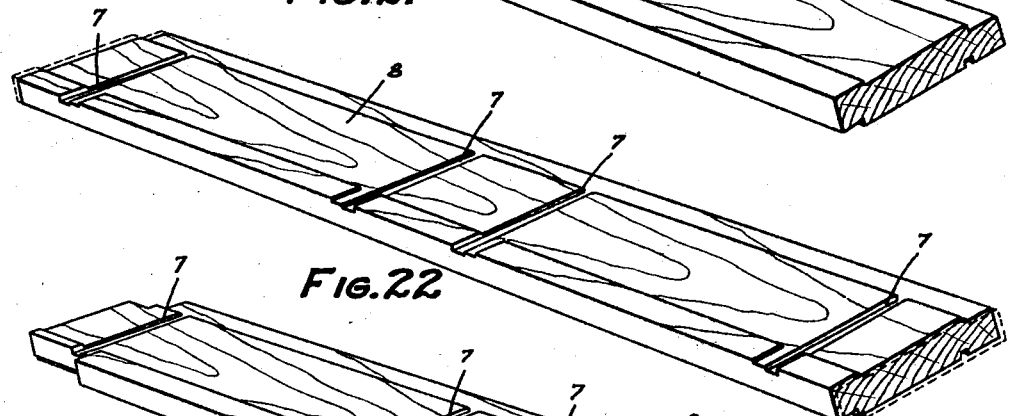
Figure 23:
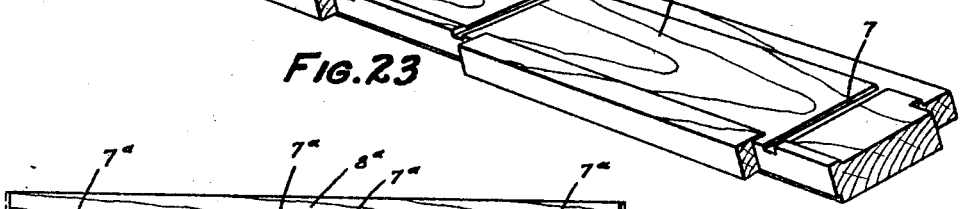
Figure 24:
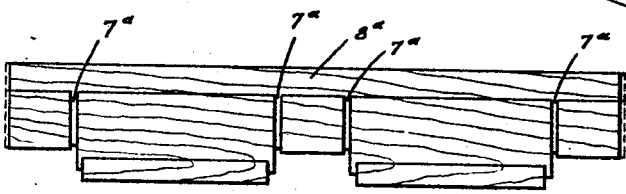
Figure 25:
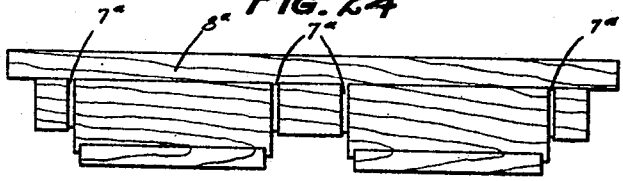
Figure 26:
Figure 27:
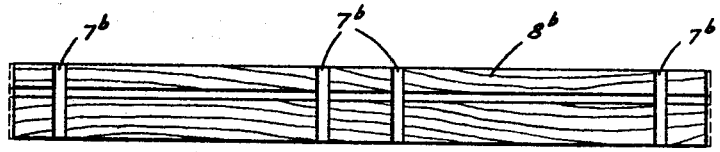
Figure 28:
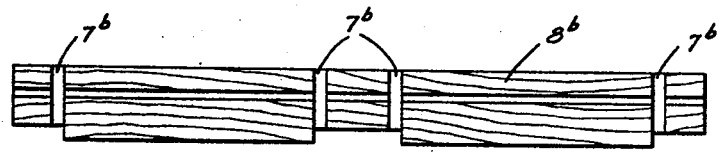
Figure 29:
Figure 30:
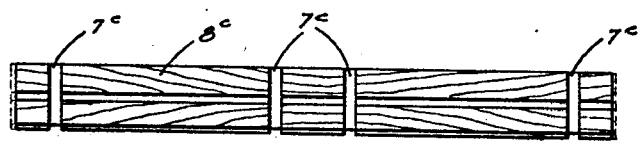
Figure 31:
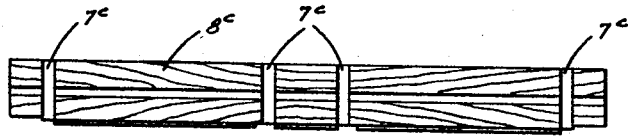

Figure 18 is an enlarged detail sectional view on the line 18—18 of Figure 3, showing the means for adjustably supporting the cutter units which cut the notches in a longitudinal edge of the work;

Figure 19 is a sectional view on the line 19—19 of Figure 18, showing the means for adjustably varying the depth of the cut;

Figure 20 is a view diagrammatically illustrating the driving connections between the various parts of the machine;

Figure 21 is a perspective view showing the sill before the dadoes and notches are cut therein, and the form in which the sills are delivered to the machine;

Figure 22 is a perspective view showing a sill with a plurality of dadoes cut in the upper surface thereof;

Figure 23 is a view similar to Figure 22, showing the sill provided with notches in the front and rear longitudinal edges thereof;

Figure 24 is a plan view showing a different type of sill partially completed;

Figure 25 is a view similar to Figure 24 showing the sill completed;

Figure 26 is a view showing a head jamb before the dadoes are cut therein;

Figure 27 is a view showing a head jamb having dadoes cut in a surface thereof;

Figure 28 is a view showing a head jamb having a plurality of dadoes cut therein and also having notches cut in one of its longitudinal edges;

Figure 29 is a view showing a different type of head jamb before cutting the dadoes and notches therein;

Figure 30 is a view showing the head jamb illustrated in Figure 29 with a plurality of dadoes cut in a surface thereof; and, Figure 31 is a view similar to Figure 30, but showing notches cut in a longitudinal edge of the jamb.

The general construction of the frame and operating parts is much the same as disclosed in my application above referred to and the preliminary description of the machine with reference particularly to the driving mechanism will correspond substantially to the description of the same parts in my former application. Referring to Figure 3 of the drawing, 2 represents a suitable frame of proper dimensions for a machine of this kind; 3 is a driving shaft operated by a suitable electric motor 4 and mounted in a suitable bearing transversely of the machine frame. This shaft is provided with trimming saws 5 for squaring the ends of the work and with suitable cutter heads 6, by means of which dadoes 7 are formed transversely in the surface of the work 8, as shown in Figure 22. Figure 21 shows a sill as it is formed preparatory to its entrance or delivery to the dadoing mechanism. These saws and the dado cutter heads are preferably mounted directly upon the driving shaft, so there is no intermediate driving mechanism between the saws and heads and the source of power. These saws and cutter heads are adjustable on the driving shaft by means of a suitable key seat as shown to vary the distance between them as will hereinafter appear. A shaft 9 is mounted in bearings in the machine frame parallel with the shaft 3 and has a pulley 10 driven through a belt 11 from the shaft 3. This forms in effect a countershaft. A suitable gear reduction mechanism contained within a box 12 connects the shaft 9 with a gear reduction shaft 13 and a belt 14 connects this gear reduction shaft with a comparatively large pulley 15, having preferably a suitable belt tightener 16'. From the shaft of this pulley 15, power is transmitted to the operating mechanism as will hereinafter appear.

The top of the machine frame is provided with what I prefer to designate as skids 16 which extend across the machine, and in these skids feed chains 17 are suitably mounted beneath a hopper 18 in which the sills 8 or other work is placed, one upon the other, preparatory to the feeding operation. The feed chains have lugs 19 thereon at intervals which engage the sills as the chains are operated to feed the bottom sill or other work from beneath the others, the movement being edgewise as usual in a feeding operation of this kind. A plate 20 is secured by suitable means to the feed belt and the upper surface of this plate and the lower surface of the lug 19 are serrated and secured together by a cap screw 21 which is tapped into the plate 20 and passes through a slot 22 in the base of the lug. The head of the screw bears on the wall of the slot to clamp the lug securely on the belt. When the screw is loosened the lug may be adjusted such distance as is permitted by the length of the slot 22 for the purpose of changing the position of the lug on the belt. This adjustment is often desirable to enable the machine attendant to properly align the lugs on the different belts and accurately time their contact with the work. It will be understood that each of the lugs on all of the belts is mounted in the manner above described. A suitable tightener 23 supported on each skid maintains the desired tension on the feed belts and, while I have shown a group of four of these belts in this machine, a greater or lesser number of them may be provided according to the length of the work that is being passed through the machine.

For the purpose of conveniently shifting the skids back and forth in parallel relation on the machine frame to adjust them the proper distance apart for the work that is being handled, I provide racks 24 on the bars of the frame and shafts 25 are mounted on the skids as shown in Figure 3, and have pinions 26 which engage the teeth of the racks 24. The machine attendant may thus revolve the shafts 25 and move the skids horizontally back and forth across the machine until the desired adjustment is obtained. During this movement the skids are held and guided and prevented from moving vertically by plates 27 which slidably engage shoulders 28 on the machine frame; see Figure 1.

The shaft 3 as shown plainly in Figure 3, is provided with a key seat or way whereon the saws and cutter heads are adjustable in a suitable way to allow them to be properly positioned with respect to the feed chains and the work.

The machine frame is provided with an upright bracket 29 and bearing brackets 30 for the shaft 3 are provided at each end of the shaft, movable vertically in guides provided in the upright face of the bracket 29. A cross member or beam 31, Figure 1, is secured at its ends to the brackets 30 and supports a center bearing bracket 32 near the middle of the shaft 3, said bracket 32 being slidable manually on a guide 33 provided on the member 31. I prefer to adjust the end bearing brackets simultaneously by means of a shaft 34 having an operating wheel 35 and a worm and wheel connection 36 with upright screw threaded rods 37 which are mounted in the bracket 29 and have their lower ends in threaded engagement with the bearing brackets 30. Movement of the wheel 35 will raise or lower the brackets 30 and with them the shaft 30 and the saws and cutter heads and evidently the bearing bracket 32 will also be raised and lowered, as it is mounted on the cross member that is secured to the brackets 30. The screw 37 has an end 38 adapted to engage a suitable tool by means of which either screw rod may be operated to raise or lower its bracket 30 independently of the other bracket, and thus effect an accurate adjustment of the saws and cutters with respect to the work. The simultaneous adjustment of the shaft and all the saws and cutter heads is usually preferable for the purpose of obtaining the proper working position of the dado heads according to the thickness of the work.

Means is preferably provided for holding the work down upon the feed belts and skids during the operation of the dado cutters and the trimming saws. This means comprises a frame 39 provided in connection with each of the cutter heads, as shown in the plan view Figure 3. The corners of each frame are provided with sprocket wheels 41 and a belt 42 encircles these wheels, and the spindle 43 of one wheel is slidable in slots 44 provided in the frame and adjusted by means of a set screw 45 whereby the tension of the belt 42 may be increased or decreased as desired. Lugs 46 and 47 are arranged in pairs on the belt and vary slightly in length to adapt them for contacting respectively with the thinner and thicker portions of the work, Figure 7. Each of the frames 39 is vertically slidable in a guide 48 provided on a bracket plate 49 suitably secured to a cross member 50 in the frame of the machine, a plate 51 secured to the bracket 49 and the cross member forming preferably one vertical wall of the hopper. Slides 52 are secured at their upper ends to the member 50 and are movable vertically in guides 53, the extent of such movement being limited by a slot 54 and bolt 55. A rod 56 has a threaded connection at 57 with the slide 52 on each side of the machine for raising and lowering it in the guides 53 when the rod is revolved, and an operating wheel 58 is provided by means of which the slide on each side of the machine may be raised or lowered independently of the other side until the exact degree of adjustment and level is obtained. With the vertical movement of the cross member 50, the presser belts 42 with the lugs thereon are also raised and lowered simultaneously and to provide for independent adjustment vertically of each presser belt, I provide a clamping screw 59 having threaded engagement with a lug 60 and adapted to bear on the bracket plate 49 whereby the attendant may easily and quickly revolve the screw and raise and lower each presser belt independently of all the others, and by the adjustment of the threaded rods 56 the cross element 50 and all the presser belts carried thereby may be adjusted simultaneously to increase or decrease the pressure of their contact with the work that is fed beneath.

As shown plainly in Figure 7, the presser belts are adjusted automatically during the feeding operation of the work by the engagement of the lugs 46 with the shoulder formed on the work.

The sill, being advanced from the hopper by the movement of the feed belts, will slide along the surface of the skids until the shoulder formed on the upper surface of the sill contacts with the longer lugs 46, whereupon the presser belts will be moved and the position of the lugs changed, so that as each successive sill is fed under the presser belts, a pair of the lugs on these belts will be moved into position to rest on the top of the sill and hold it firmly down on the skids during the operation of cutting the dadoes therein or trimming the ends of the work. In this way the movement of the work itself advanced by the feed belts changes the position of the presser belts so there will always be a pair of the lugs on these belts in position to contact with the work and hold it firmly and as the sill advances on the skids and passes out from under a pair of the lugs, another pair will be shifted, one of them in position to engage the shoulder on the following piece of work, to repeat the adjustment of the belts.

When a jamb is fed into the machine two lugs 47 of the same length are provided on each presser belt and also a third larger lug 46$^a$ (Figure 7—A) which is engaged by the moving jamb and thereby the belt is moved to position the lugs 47 to bear on the jamb and hold it firmly during the dado cutting operation.

In feeding jambs having straight or square longitudinal edges, lugs 19$^a$ having corresponding faces to meet the square edges of the jamb are substituted for the lugs 19 on the feed belts which have beveled faces to meet the corresponding face of each sill. In other respects the feeding of the jambs, the holding of them, and cutting the dadoes in the surfaces thereof, will be performed in substantially the same manner as described with reference to the sills.

By means of the foregoing described mechanism the work, such as sills and jambs, may be trimmed at each end and dadoes formed at the ends alone or at the ends and middle portion, or any other point if desired, these dadoes being of any desired depth depending upon the vertical adjustment of the cutter heads supported over the work, and when the work passes from under the cutter heads it is received by a second feature of the machine, where provision is made for moving the work at an angle to its previous direction of movement and notching or cutting recesses in one or both longitudinal edges of the work during said angular movement. The mechanism which I preferably employ and which embodies an improvement over the structure of my application above referred to for this purpose, I will now proceed to describe in detail.

The shaft 61, Figure 1, on which the pulley 15 is mounted is provided with a gear 62 having a driving connection 63 with one end of a shaft 64, which in turn drives a short shaft 65 through a chain belt 66; see Figure 20. Double sprocket hubs 67 are mounted in the ball bearings (Figure 5$^a$) and are key-seated on the shaft 64 to slide thereon. The inner ends of the skids 16 are mounted on these double sprocket hubs and frames 16$^a$ are also secured to said hubs and project inwardly and downwardly therefrom. One of the double sprockets in connection with each skid engages the feed belt of that skid and supplemental feed belts 68 connect the other member of each double sprocket with similar sprockets 69, mounted in the lower portions of the frames 16$^a$; see Figures 1 and 20. When, therefore, the operator adjusts the skids laterally on the machine frame to change their relative position and compensate for varying lengths of the work, a similar adjustment will at the same time be effected of the frames 16$^a$, and the supplemental feed belts carried thereby, the double sprocket hubs sliding back and forth on the shaft 64 to allow for the adjustment of the primary and secondary feed belts.

Upright skids 70 are slidably supported upon a transverse I beam 71 that is bolted at 72 to the upright flanges of brackets 73 seated upon the machine frame and slidable back and forth thereon, there being preferably one bracket on each side of the machine as shown in Figure 3. Adjusting screws 74 have worm and wheel connections 75 with a shaft 76 by means of which both screws 74 may be operated simultaneously to move the brackets 73 back and forth on the machine frame. The screws are tapped into the base of the brackets and provided with lock nuts 77 which may be moved to a release position and then by means of a suitable tool engaging the outer end, each screw may be adjusted to move one bracket independently of the other one until the exact alignment is obtained.

Referring to Figures 1, 10, and 11, the skids 70 are shown provided with plates 78 adapted to engage the opposite flanges of the I beam for the purpose of guiding the skids in their movement back and forth on the I beam, there being preferably two pairs of these guiding plates as indicated by dotted lines in Figure 11. The I beam is preferably provided with a rack bar 79 and each skid has a shaft 80 provided with a pinion 81 to mesh with the rack bar, the end of the shaft being adapted to receive a suitable tool, by means of which the shaft may be revolved and the skid moved until the desired adjustment of the elevating carrier is obtained. Figures 1 and 2. A shaft 82 is journaled at its ends in bearings 83 provided on the brackets 73 and a driving belt 83ª engages the teeth of a sprocket wheel 84 on the shaft 65. A hub 85 is secured on one end of the shaft 82 and is provided with a friction ring 86 against which a gear ring 87 is seated and secured by means of a clamping ring 88 and bolts 89 which pass through said ring and are tapped into the hub 85. This manner of mounting the gear ring 87 allows for its rotary adjustment independently of the shaft 82 whereon it is mounted and enables the attendant to shift the carrier belts and the carriers mounted thereon and time their movement without the necessity of turning the driving shaft for these belts. Each of the upright skids mounted for movement horizontally on the I beam 71, as heretofore described, is provided with a carrier belt 91 connecting suitable sprocket wheels 92 and 93, the latter being vertically adjustable in slots 94 provided in the supporting skid to allow the desired degree of tension to be applied to each carrier belt. Evidently when the skids are moved back and forth on the supporting I beam they will be adjusted in the desired position to receive the work that is to be notched from the secondary belts 68 the upper ends of the skids having bearings for the shaft 82 and slidable thereon to shift the hubs of the ball bearing sprockets (Figure 6ª) 92 back and forth in the key-way of the shaft 82 in the horizontal adjustment of the skids across the machine. These skids will thus move across the work delivery belts 68 and for the purpose of picking up each piece of work on these belts and elevating it past the notching heads, I prefer to provide the following described mechanism: the description of one carrier and its associated parts corresponding to that for each of the other carriers.

Referring to Figures 12, 12—A, 13, and 14, 95 represents an angle plate that is secured to a link of the elevator belt 91 and is held within a recess provided in a bracket 92ª by a bolt 93ª. The bracket 92ª has flanges 94 slidable in guides 95 provided in the face of the skid and is secured to the carrier belt and a plate 96 is pivoted on said bracket at 97 and has a limited oscillating movement with respect to the bracket by means of a slot 98 and a bolt 99 fitting loosely therein, adjustment of said plate 96 on the bracket being obtained by means of spaced holes 100 in the bracket adapted to receive a spring pressed pin 101. The attendant by pulling the pin out of engagement with one of the holes 100 may swing the plate 96 on its support to a tilted position with respect thereto. The plate 96 has lugs 102 and 103 wherein a rod 104 is slidable. A block 105 is carried by the plate 96 and has ears 106 and 106ª. These ears receive the rod 104 and the outer ear 106ª is secured to this rod. A compression spring 107 is mounted on the rod between the lug 103 and lock nuts 108 which have a threaded adjustment on said rod by means of which the tension of the spring can be considerably increased or decreased as desired. The block 105 is provided with a longitudinal opening 109 and a sliding jaw 110 is adjustably secured in said opening by means of a bolt 111. When this bolt is loosened the jaw may be adjusted forward and backward on the block 105. The outer end of the jaw has a flange 112 and is adapted to engage each piece of work and press it firmly against the upright face of the adjacent skid so that the work will be securely held during the notching operation. A plate 113 is secured to the wall of the skid in the path of the rod 104, said plate having a lower cam face 114 which, in the ascent of the carrier, is positioned to engage the end of the rod 104 and project it, the block 105, and the jaw carried thereby outwardly to the position indicated by dotted lines in Figure 12, where it will pick up the work from the belts 68, and as the upward movement of the carrier continues the bolt will slide on the vertical edge of the plate 113 until it reaches the cam face 115, which will permit the rod to resume its normal position and the jaw flange engage the edge of the work and hold it firmly on the carrier during the notching operation. To adapt the carrier for work of different widths, the jaw 110 may be adjusted on its support and thereby suitably positioned to receive and clamp the work as it is engaged by the vertically moving carrier.

When a sill is to be notched and it is desirable to tilt the work to form a notch of uniform depth by the operation of the cutting head, the pin 101 will be drawn out and the plate 96 adjusted and in case an adjustment between the holes 100 is desired, it may be effected by allowing the pin to rest against the face of the bracket 92ª and securing the plate 96 by tightening the bolt 99 in the slot 98. Thus any desired adjustment may be obtained to compensate for the beveled edge of the sill that is to be notched.

To compensate for the slack in the driving belt 83ª, due to the forward and backward adjustment of the skids and the I beam 71, I prefer to provide a bracket 116 on the I beam whereon a sprocket wheel 117 is adjustably mounted and adapted to engage the links of the belt 83 and thereby the tension of said belt is increased or decreased as desired.

The notch cutting heads which I prefer to provide in this machine are illustrated in Figure 2—A and the plan view Figure 3. Referring to these figures and also Figure 1, the bracket 29 has a horizontal guide 118 for a carrier 119. A shaft 120 is mounted on the carrier and has a rack and pinion connection 121 with the guide 118, by means of which when the shaft 120 is revolved the carrier may be moved back and forth horizontally on the guide to adjust it with respect to the work. A cutter head 122 is mounted on an arbor 123 driven by a motor 124, and suspended on the carrier 119 by means of plates 125. A rod 126 mounted on the carrier has a threaded connection at 127 with the frame of the motor whereby when the rod 126 is revolved, the motor and the cutter head may be moved back and forth toward or from the supporting guide 118 to adjust the cutter head for the varying dimensions of the work and the desired depth of the notches to be cut therein. As indicated in Figure 2—A, I have provided end notching units of the type above described for different lengths and kinds of work which I will indicate by a general reference letter "A" and adjacent thereto an intermediate notching unit designated by "B", and corresponding in structure to the unit "A" except in the form of the notching cutter itself, designed to notch the middle portion of the work, while the notching units "A" are intended for cutting notches at the ends of the work.

These notching units A, A, A, and B (four being shown herein—Figure 2—A), supported on substantially the same level are not only capable of adjustment on the supporting guide back and forth across the machine to adapt them for sills or jambs of different lengths, but each unit is also capable of adjustment at right angles to its adjustment on the supporting guide so that not only can the machine be readily adapted for varying lengths of work, but also for work that varies in width; or to enable the attendant to cut notches of varying depth in the different pieces of work. These units will have independent operating motors and in addition to their independent adjustment may be operated independently of one another as may be desired.

Any suitable number of these motor operated units may be provided, according to the nature of the work to be performed.

The notching mechanism above described will form the end and middle notches in the sill, as shown in the perspective view of the sill in Figure 23. In some cases, however, it is desirable to notch the opposite edge of the sill, as illustrated in this same figure and to accomplish this, I provide carriers 128 slidably supported at 129 on the lower flanges of the I beam 71. These carriers have rack and pinion adjustment, as indicated at 130, corresponding to the adjustment heretofore described with reference to the carriers 119, provision being made for moving the carriers 128 back and forth on the I beam in the same manner as described with reference to the carriers 119. Beneath each carrier 128 is a frame 131 supported in guides 132 on the carriers 128 and adjustable back and forth with respect to said carriers toward and from the opposite cutting head of unit A. A rack and pinion mechanism, not shown, corresponding to that illustrated in detail in Figures 18 and 19, is provided for each frame 131 so that the attendant by means of these adjustments may move each supporting frame 131 and the cutter head 133 carried thereby to adjust the cutters with respect to the width of the work and the depth of the end notches desired therein, these notches being plainly shown in the perspective view of the sill in Figure 23.

The unit of which the frame 131 forms a part, I will designate as unit D, and I prefer to provide four of these units D opposite units A and B. See Figure 2—A.

As shown in Figure 25, it is sometimes desirable to provide a piece of work with double notches at each end, in which case two of these notches, one at each end of the sill and the intermediate notch, are formed by the units A and B and to form the second end notch units C, as shown in Figure 3, are provided. These units have carriers 134 slidably supported on guides 135, each cutting head 136 being supported in a frame 137 that is mounted on the carriers 134. The carriers and the frames supporting the notching heads are adjustable by the same means provided for the units A and B, and I will indicate the adjusting means by the same reference numeral with the addition of the exponent "a." These units C, as illustrated plainly in Figure 2 of the drawing, are supported above the level of the units A and B and consequently may be moved back and forth over these units, and when not in use may be moved to one side, as indicated by full lines in Figure 3, where they will not engage the work and not in any way interfere with the operation of the units A and B. When, however, the nature of the work requires the additional end notches, these units C can be easily and quickly adjusted to a position where their cutting or notching heads will engage the ends of the work and cut the secondary or supplemental notches therein.

From the foregoing description, it will be understood that provision may be made for the use of any desired number of these motor driven cutters arranged in groups across the machine, some of the groups being on the same level to notch opposite longitudinal edges of the work and other units being upon a different level, all to the end that the notching operation may be performed in an accurate expeditious manner. I do not, however, wish to be confined to the particular number of the motor units shown herein or the relative position of these units, as suitable variations may be made according to the size and the character of the work, each unit being capable of adjustment independently of the other units so that notches of varying depths may be formed in the sills and jambs, and the position of these notches may be varied to suit the needs of the manufacturer.

Referring now to Figures 15 and 16, it is desirable to provide some means to prevent longitudinal movement of the work during the notch cutting operation, and with this end in view, I provide carriers 138 slidable back and forth on the I beam 71 and supporting bars 139 have vertical edges 140 for contacting with the ends of the work. The bars 139 are adjustable on the carriers by means of slots 141 and bolts 142 which pass through the slots 141 and are tapped into the carriers. Upon loosening these bolts, the bars 139 may be moved horizontally independently of the adjustment of the supporting carriers. The lower ends of the bars are slightly tapered, as indicated in Figure 15, to prevent any portion of the work contacting with the ends of the bars and interrupting the operation of the machine. As soon as the work has passed the notching heads it may be delivered by the carriers on the opposite side of the I beam from the notching heads and discharged in any suitable manner from the machine.

In Figure 26, I have illustrated a conventional form of head jamb which I will designate by reference numeral 8$^b$ and in Figure 27 this jamb is shown provided with dadoes 7$^b$ and in Figure 28 notches are shown formed in the ends of one longitudinal edge and also in the middle.

In Figure 29 another type of head jamb is illustrated, which I will designate by reference numeral 8$^c$, shown with dadoes 7$^c$ in Figure 30 and with the dadoes and notches in Figure 31.

In the operation of the machine the work to be grooved and notched is placed in the hopper, as shown in Figure 1, one piece above another extending across the machine, the skids supporting the primary feed belts and the secondary belts forming a continuation of the primary belts having been properly adjusted to adapt them for feeding the work edgewise. The grooving or dadoing cutters and the trimming saws are also properly adjusted so that the ends of the work will be suitably trimmed and, at the same time, the desired dadoes will be formed in the upper surface of the work; each piece being firmly held down upon the skids by the presser mechanism provided in connection with each cutting head.

As the work passes from the primary feed belts it is delivered thereby to the secondary belts and each piece is moved into the path of the elevating carriers; there being a group of these carriers on each elevating belt that is movable across the machine by the adjustment of the supporting skids; this adjustment being for the purpose of properly positioning the skids and elevating belts to adapt them for the length of the piece of work advanced by the movement of the secondary feed belts. If the form of sill illustrated in Figure 21 is fed into the machine, its surface will be grooved as indicated in Figure 22 before delivery to the secondary feed belts. Upon delivery to the elevating carriers, the sill will be notched, as indicated in Figure 23, provision being also made for notching both longitudinal edges of the sill at each end and at other points if desired.

When it is desired to form a double notch at each end, the units C are adjusted to engage the sill following the operation of the units which notch one edge at each end and the middle portion. The elevating carriers are formed in such a way that the slides forming the jaws of the carriers will be moved outward automatically preparatory to receiving the work, and when a piece of work is seated on one group of carriers, the jaws will be automatically released to press the work with a yielding pressure against the face of the skids and hold it firmly in that position during the notch cutting operation, the cutting heads and the elevating belts and their supporting skids having been previously adjusted to adapt them for the dimensions of the work that is to be notched.

When the discharge point of the machine is reached, the carrier jaws will be in release position and allow the work to be discharged by gravity from the machine. When sills are being notched, the carriers are tilted to adapt them for notching the beveled edge of the sill and thereby notches of uniform depth in their edge will be formed.

In various ways the details of construction herein shown and described may be modified and still be within the scope of my invention.

I claim as my invention:

1. In a machine of the class described, the combination with a suitable frame, of a drive shaft mounted thereon, cutter heads adjustably mounted upon said shaft to be driven thereby, skids supported beneath said heads, rack bars extending transversely of said skids, means associated with said skids and engaging said rack bars to adjust said skids to vary the distance between them and to align them with respect to said heads, a hopper wherein the work is placed one piece over another, feed belts mounted in said skids beneath said hopper and having lugs at intervals to engage the bottom piece of work and feed it beneath said cutters the adjustment of said cutter heads and said skids adapting them for varying lengths of the pieces of work.

2. The combination with a frame, of skids and feed belts mounted thereon, rack bars mounted in said frame, shafts mounted on said skids and having pinions meshing with said rack bars, whereby any of said skids may be moved back and forth on said frame to vary the distance between them, a driving shaft above said skids, cutter heads adjustably mounted on said shaft, a hopper adapted to receive the pieces of work placed one upon another therein, said feed belts having means for engaging the bottom piece of work in said hopper and moving it edgewise beneath said cutters.

3. The combination with a frame, of a series of skids arranged in parallel, horizontal relation thereon, rack bars mounted in said frame transversely of said skids adjacent the end portions thereof, shafts mounted on said skids lengthwise thereof and having pinions adapted to engage the teeth of said rack bars, whereby when said shafts are revolved said skids may be moved back and forth on said frame, feed belts mounted in said skids and having lugs thereon at intervals, a hopper above said skids adapted to receive pieces of work placed one above the other and a driving shaft and cutter heads thereon supported above said skids and beneath which cutter heads the work is fed by said belts.

4. The combination with a frame, of skids mounted thereon, means for adjusting them back and forth on said frame to vary the distance between them, feed belts operating in said skids and movable therewith, cutter heads supported above said skids and adjustable for operating alignment therewith, said feed belts having means for feeding the work edgewise on said skids beneath said cutter heads, secondary feed belts whereto the work is delivered by said primary belts, said secondary belts being mounted for adjustment simultaneously with said skids and said primary belts.

5. In a machine of the class described, a frame, feed belts having lugs at intervals thereon for engaging the work, and feeding it edgewise, presser belts having lugs thereon at intervals adapted to bear on the work, the work as it is moved edgewise by said feed belts engaging certain lugs of said presser belts to adjust them and said belts in position to bear on the work, and cutter heads operating adjacent to said presser belts.

6. In a machine of the class described, a frame, feed belts having lugs thereon for engaging the work and moving it edgewise, presser belts having lugs arranged in pairs, one lug of each pair being longer than the other lug and adapted to contact with a thinner portion of the work beneath, the longer lugs being engaged by a shoulder on the work to move the presser belts and adjust the lugs thereon to the work.

7. In a machine of the class described, a suitable frame, feed belts mounted thereon, a hopper above said feed belts wherein the work is placed, one piece above another, means on said belts for advancing the work out of said hopper, cutter heads having means for grooving the upper surface of the work, presser belts and lugs thereon adapted to bear on the work and hold it firmly during the grooving operation and lugs on said presser belts of greater length than those for bearing on the work to be engaged by the forward edge of the work to adjust the belts in their work holding position.

8. In a machine of the class described, a frame, primary and secondary feeding means therein for moving the work edgewise in a substantially horizontal direction, elevating means operating vertically past said secondary feeding means, and having carriers for engaging the work on said secondary feeding means and moving it vertically, and cutter heads for notching a longitudinal edge of the work during such vertical movement.

9. The combination with a frame having a transverse guide thereon, of carriers having means for moving them back and forth on said guide, cutter heads and motors therefor supported on said carriers and adjustable thereon independently of the adjustment of said carriers on said guides, upright elevating belts having means for adjustment parallel with the adjustment of said carriers and also having an adjustment toward and from said cutter heads, and carriers mounted on said belts and adapted to pick up pieces of work and elevate them past said cutter heads.

10. In a machine of the class described, a suitable frame, upright brackets adjustable back and forth thereon, a cross member carried by said brackets, carriers adjustably mounted on said brackets for movement back and forth thereon, a frame supported by said carriers and slidable thereon at right angles substantially to the direction of movement of said carriers, a cutter head carrier by said frame, and means for moving the work vertically past said cutter head to cut notches in a longitudinal edge thereof.

11. The combination with a frame, of upright brackets thereon, a cross member mounted on said brackets, upright skids having means for adjustment lengthwise on said cross member, cutter heads supported opposite said skids and having means for adjustment commensurate therewith, elevating belts mounted in said skids, carriers supported at intervals on said elevating belts and adapted to pick up pieces of work and elevate them past said cutter heads, and means for delivering the work into the path of said carriers.

12. The combination with a frame, of upright skids mounted thereon, elevating belts mounted in said skids, carriers provided at intervals on said belts, each carrier comprising a fixed member and jaw having a forward and backward movement and adapted to pick up pieces of work, and means whereby each jaw will be projected prior to its engagement with the work, means for yieldably holding each jaw against the work, cutter heads provided adjacent said carriers, and means for moving said skids toward or from said cutter heads.

13. The combination, with means for feeding the work edgewise, of elevating carriers and jaws therefor adapted to engage and move the work vertically, means whereby said jaws will be automatically opened to receive the work and closed to clamp the work during its vertical movement, and means for notching a longitudinal edge of the work during such movement.

14. In a machine of the class described, a series of elevating carriers adapted to pick up the successive pieces of work and move them vertically, each carrier having a jaw and means for initially opening each jaw preparatory to receiving the work, means whereby the jaw will be retracted to yieldingly grip the work during its vertical movement, and means for notching a longitudinal edge of the work during such movement.

15. In a machine of the class described, means for feeding the work edgewise, of elevating carriers adapted to move past said feeding means and pick up the pieces of work successively, each carrier comprising a fixed element and a jaw adjustably mounted thereon, the jaw having a flanged end to engage one edge of the work, and means for projecting the jaw preparatory to receiving the work, said jaw also having means whereby its flanged end exerts a yielding pressure on the work supported thereby, and means for notching a longitudinal edge of the work.

16. In a machine of the class described, an elevating belt, carriers mounted at intervals thereon, each carrier having a sliding jaw, a bolt connected with each jaw, a spring for normally holding said jaw in its retracted position and a cam device adapted to contact with said carrier to project said jaw and hold it in its projected position against the tension of said spring for a predetermined period.

17. In a machine of the class described, an elevating belt, carriers mounted at intervals thereon, each carrier having a sliding jaw, a bolt connected with each jaw, a spring for normally holding said jaw in its retracted position and a cam device adapted to contact with said bolt at a predetermined point in the movement of said carrier to project said jaw and hold it in its projected position against the tension of said spring for a predetermined period, and means whereby each jaw may be tilted to change its angle to the horizontal.

18. The combination with means for feeding the work, edgewise, of vertically moving carrier belts having means thereon adapted to engage the work on said feeding means and move it vertically, means for tilting the work on said carrier belts and means for notching an edge of the work during its vertical movement.

19. The combination with means for feeding the work edgewise in a substantially horizontal direction, of carrier belts having means adapted to engage the work on said feeding means and move it in a vertical direction with respect thereto, means for adjusting said means to tilt the work thereon and means for notching a longitudinal edge of the work.

20. In a machine of the class described, a series of elevating belts, carriers mounted thereon at intervals, each carrier comprising a fixed and a tilting member and means for adjusting said tilting member to change its angle with respect to the fixed member, and notching heads mounted adjacent to said elevating belts.

21. The combination with means for feeding the work horizontally, of means for elevating the work comprising jaws having means whereby they will be opened to receive the work and closed to clamp it, and means for notching an edge of the work while so clamped.

22. The combination with means for feeding the work, of clamping jaws for engaging the work and moving it vertically, cutter heads arranged in groups, and means whereby each head may be adjusted lengthwise or transversely of the work to adapt them for the varying dimensions of the work.

23. In a machine of the class described, an upright bracket and horizontal guides thereon arranged upon different levels across the machine, carriers slidably mounted on said guides, cutter heads supported by said carriers and each head having an operating motor, means whereby each carrier and the head supported thereby may be moved back and forth on said guides and means for adjusting each cutter head on said carrier toward and from its supporting guide, and means for moving pieces of work of varying dimensions vertically to be engaged by said cutter heads.

24. In a machine of the class described, a suitable frame, an upright bracket thereon, a transverse guide on said bracket, cutter heads having independent operating motors, carriers supporting said cutter heads and motors on said guides and adjustable back and forth thereon, there being end and intermediate cutter heads, means for moving the work vertically past said cutter heads to cut notches in one longitudinal edge of the work, and cutter heads provided opposite said end cutter heads for cutting notches in the opposite edge of the work as it is fed vertically.

25. In a machine of the class described, a suitable frame, means for moving the pieces of work separately edgewise on said frame, means for receiving and elevating each piece of work separately, said means having jaws for holding the work firmly during the elevating movement, and cutting units provided upon opposite sides of the work, each unit having an independent operating motor and each unit having an adjustment laterally and longitudinally of the work, whereby the units are adapted for pieces of work of varying lengths and widths.

26. The combination with vertically moving carriers adapted to pick up the work and elevate it, of cutter heads arranged to notch the work during such movement, and bars adjustably mounted horizontally between which the work is moved, said bars having edges adapted to contact with the work and hold its against longitudinal movement during the notching operation.

27. The combination, with means for feeding the pieces of work successively, of carriers operating between said feeding means and adapted to pick up the pieces of work, one at a time, and elevate them, cutter heads past which the work is moved by said carriers, and adjustable means adapted to contact with the ends of the work prior to its engagement with said cutter heads and hold it against longitudinal movement during the notching operation.

28. In a machine of the class described, means for automatically receiving, clamping and elevating each piece of work separately, cutter heads arranged in groups upon opposite sides of the work, each head having an operating motor and means for adjustment whereby each head may be moved longitudinally or transversely of the work for cutting notches in its longitudinal edges of varying depth and at different points in said edges.

29. In a machine of the class described, means for automatically receiving, clamping and elevating each piece of work separately, cutter heads arranged in groups upon opposite sides of the work, each head having an operating motor and means for adjustment whereby each head may be moved longitudinally or transversely of the work for cutting notches in its longitudinal edges of varying depth and at different points in said edges, there being two of the groups upon different levels and upon the same side of the work.

In witness whereof, I have hereunto set my hand this 23rd day of December, 1930.

ARTHUR B. JOHNSON.